(12) United States Patent
Uematsu

(10) Patent No.: US 6,505,287 B2
(45) Date of Patent: Jan. 7, 2003

(54) VIRTUAL CHANNEL MEMORY ACCESS CONTROLLING CIRCUIT

(75) Inventor: Takeshi Uematsu, Niigata (JP)

(73) Assignee: NEC Corporation, Tokyo (JP)

( * ) Notice: Subject to any disclaimer, the term of this patent is extended or adjusted under 35 U.S.C. 154(b) by 172 days.

(21) Appl. No.: 09/733,938

(22) Filed: Dec. 12, 2000

(65) Prior Publication Data

US 2001/0039605 A1 Nov. 8, 2001

(30) Foreign Application Priority Data

Dec. 20, 1999 (JP) .......................................... 11-360827

(51) Int. Cl.[7] .......................... G06F 12/00; G06F 13/00
(52) U.S. Cl. ...................... 711/170; 711/100; 711/154; 711/203
(58) Field of Search ............................ 711/100, 6, 149, 711/154, 160, 170, 200, 203

(56) References Cited

U.S. PATENT DOCUMENTS 5,901,332 A * 5/1999 Gephardt et al. ............. 710/41
5,954,796 A * 9/1999 McCarty et al. ............. 709/222
6,091,714 A * 7/2000 Sensel et al. ................ 370/260
6,175,514 B1 * 1/2001 Henderson et al. ........... 365/49
6,275,502 B1 * 8/2001 Arimilli ...................... 370/468

FOREIGN PATENT DOCUMENTS

JP          7-221797          8/1995

* cited by examiner

*Primary Examiner*—Tuan V. Thai
(74) *Attorney, Agent, or Firm*—Sughrue Mion, PLLC

(57) ABSTRACT

Disclosed is a virtual channel memory access controlling circuit for controlling accesses from a plurality of memory masters to a virtual channel memory having a plurality of channels, comprising: a channel information storing portion having a plurality of storage areas, each of the storage areas being assigned to any of the memory masters, each of the storage areas corresponding to each of the channels, each of the storage areas having a channel number and a memory address, the channel number identifying a channel, and the memory address being sent to the virtual channel memory; detector for detecting necessity of a change of assignment of storage area between memory masters; and changer for dynamically changing the assignment of the storage area between memory masters.

16 Claims, 13 Drawing Sheets

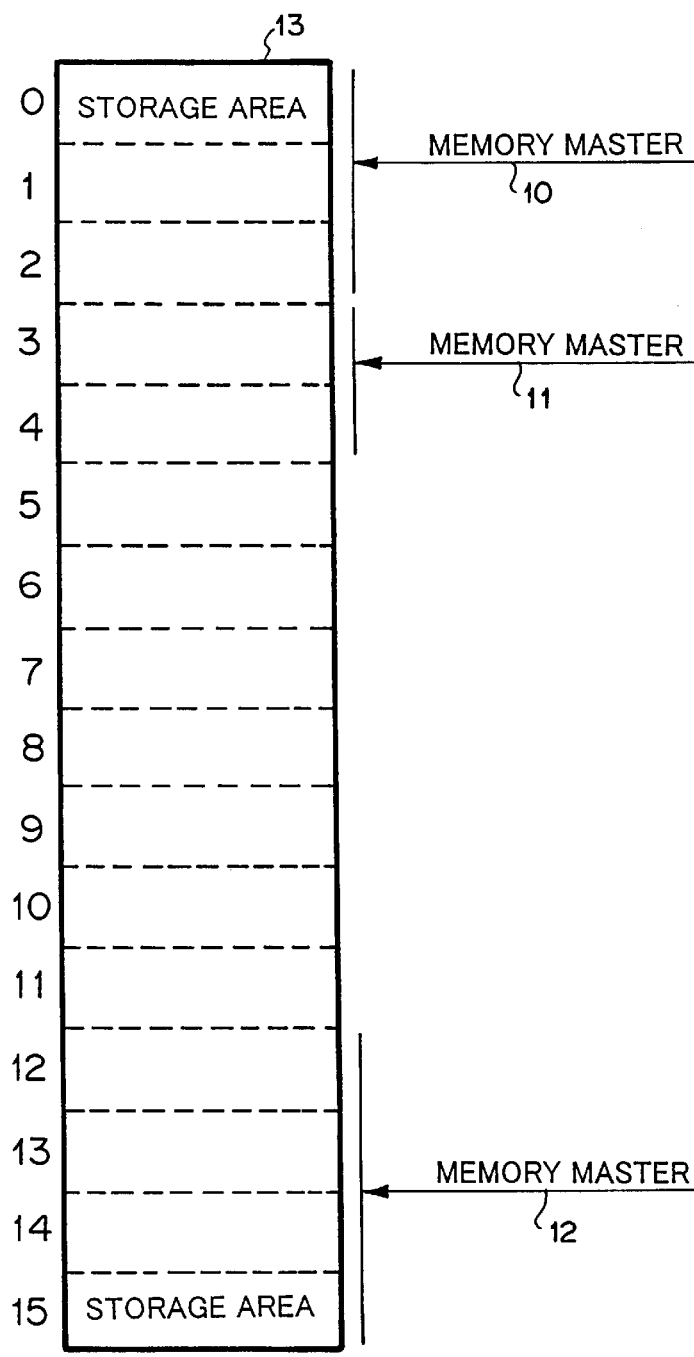

VIRTUAL CHANNEL MEMORY ACCESS CONTROLLING CIRCUIT

BACKGROUND OF THE INVENTION

1. Field of the Invention

The present invention relates to a virtual channel memory access controlling circuit and in particular, to a virtual channel memory access controlling circuit for controlling a virtual channel memory (referred to as VCM) with a controlling method of the least recently used method (referred to as LRU).

2. Description of the Prior Art

Next, with reference to the accompanying drawings, a conventional VCM will be described. FIG. 1 is a schematic diagram showing the concept of the VCM. FIG. 2 is a block diagram showing the structure of a conventional memory system using the VCM. Referring to FIG. 1, VCM 60 has a plurality of channels 50 composed of registers, and a memory cell 51 is composed of a plurality of segments. Each of the channels 50 is connected to all the segments of the memory cell 51. Each segment is a data access unit. In other words, any address of the memory cell 51 can be accessed through any channel. Each of the channels 50 is assigned a unique channel number.

Referring to FIG. 2, the memory system is composed of VCM 60, virtual channel memory access controlling circuit 62, and memory masters 67, 70, and 73. The memory masters 67, 70, and 73 are processors that execute, for example, jobs.

The virtual channel memory access controlling circuit 62 performs reading/writing operations, i.e. foreground process, from/to the channels 50. The virtual channel memory access controlling circuit 62 also performs internal operations such as a data transferring operation between the memory cell 51 and the channels 50, a pre-charging operation, and a refreshing operation for the memory cell 51, i.e. background process, independent from the foreground process. Since the virtual channel memory access controlling circuit 62 independently performs the foreground process and the background process, a high average data transfer rate for the VCM 60 can be accomplished.

The channels 50 of the VCM 60 and the virtual channel memory access controlling circuit 62 are connected by a dedicated memory bus 61. The virtual channel memory access controlling circuit 62 comprises a memory interface controlling portion 63, an arbiter portion 64, channel information storing portions 65, 68, and 71, and LRU controlling portions 66, 69, and 72. The memory interface controlling portion 63 controls the memory bus 61. The arbiter portion 64 arbitrates access requests issued from the memory masters 67, 70, and 73. The channel information storing portions 65, 68, and 71 store information of the channels 50 of the VCM 60. The LRU controlling portions 66, 69, and 72 control the channel information storing portions 65, 68, and 71 corresponding to the LRU controlling method.

The channel information storing portions 65, 68, and 71 and the LRU controlling portions 66, 69, and 72 are disposed corresponding to the memory masters 67, 70, and 73, respectively, so as to fulfill the feature of the VCM 60. To deal with multitask processes of the memory masters 67, 70, and 73, proper numbers of channels 50 are assigned to the memory masters 67, 70, and 73 so as to shorten the access wait times of the memory masters 67, 70, and 73. In that example, as shown in FIG. 2, it is assumed that three channels 50 are assigned to the memory master 67; two channels 50 are assigned to the memory master 70; and four channels 50 are assigned to the memory master 73. In that case, the channels 50 are not redundantly assigned to a plurality of memory masters. Thus, the number of channels 50 is nine.

Next, the operation of the above-described virtual channel memory access controlling circuit 62 will be described. In the example, it is assumed that the memory master 67 reads data from the VCM 60.

When the memory master 67 issues a read request to the arbiter portion 64, the arbiter portion 64 arbitrates the read request issued from the memory master 67 with access requests issued from the memory masters 70 and 73 to the VCM 60. The arbiter portion 64 permits the read request of the memory master 67 just after or in a predetermined time period after the memory master 67 has issued the read request. Thereafter, the memory master 67 designates a memory address that contains a bank address, a row address, a segment address, and a column address, and issues the read request with the designated address to the channel information storing portion 65.

The channel information storing portion 65 determines whether the bank address, the row address, and the segment address in the memory address of the read request match those in any storage area of the channel information storing portion 65. When the determined result is Yes, a channel hit takes place. When the determined result is No, a channel miss takes place. Each register of each channel 50 stores data of address groups designated by a bank address, a row address, and a segment address.

When a channel hit takes place, the memory address supplied from the memory master 67 to the channel information storing portion 65 is stored to a storage area corresponding to the hit channel. The LRU controlling portion 66 designates the hit channel as the lowest rank channel. In other words, the LRU controlling portion 66 designates the hit channel as the most recently used channel. In addition, the LRU controlling portion 66 upwardly shifts the ranks of the other channels by one.

On the other hand, when a channel miss takes place, the memory address supplied from the memory master 67 to the channel information storing portion 65 is stored to a storage area of the highest rank channel. In addition, the LRU controlling portion 66 shifts the channel that has stored the memory address from the highest rank channel to the lowest rank channel. In other words, the LRU controlling portion 66 designates a channel to which a memory address is newly stored as a channel that was most recently used. In addition, the LRU controlling portion 66 upwardly shifts the ranks of the other channels by one.

The channel information storing portion 65 outputs a memory address stored in the storage area to the memory interface controlling portion 63 along with channel information. As a result, the memory interface controlling portion 63 generates a read cycle on the memory bus 61.

FIG. 3 is a time chart showing the cases that a channel hit and a channel miss take place in a read cycle.

Referring to FIG. 3, PRE represents a pre-charge command that sends a bank address; ACT represents an activate command that sends a bank address and a row address; PFC is a pre-fetch command that sends a segment address and a channel number; and READ represents a read command that sends a channel number and a column address. When a channel miss takes place, namely, valid data to be read is stored in none of channels 50, a bank that has been activated in the memory cell 51 is deactivated by a pre-charge command. Then, a row address at which valid data is stored is activated by an activate command. Then, the data is copied from the memory cell 51 to the channel 50 by a pre-fetch command. Then, the data is read from the channel 50 by a read command. On the other hand, in the case of a hit cycle, namely, data to be read is stored in a channel 50, the cycle is completed with only a read command. As is clear from FIG. 3, the cycle time in the case of a channel miss takes place is longer than that in the case of a channel hit.

A prior art reference of JPA 7-221797 discloses a FIFO memory controlling system. The FIFO memory controlling system can be used in common with an information processing system having one channel of an information generating source that generates information at a high data generation frequency and another information processing having a plurality of channels of information generating sources that generate information at a low data generation frequency. In addition, the memory use efficiency of the FIFO memory controlling system is high.

However, the above-described prior art references have the following problems. The number of channels assigned to each of the memory masters 67, 70, and 73 is designated by a setup register such as a configuration register. The number of channels that have been assigned cannot be changed unless the system is reset. Thus, it is very difficult to automatically detect the memory access frequencies of the memory masters 67, 70, and 73 and adjust the number of channels assigned to each of the memory masters 67, 70, and 73.

For example, in FIG. 2, it is assumed that the memory access frequency of the memory master 70 is very high, whereas the memory access frequency of the memory master 73 is very low. In contrast with this, the number of channels assigned to the memory master 70 is as small as "2", whereas the number of channels assigned to the memory master 73 is as large as "4". When the number of channels assigned is small, the probability that a channel miss that occupies the memory bus 61 takes place is high. When the memory access frequency is high, the probability becomes much higher. As a result, the performance of the system deteriorates.

According to the prior art reference of JPA 7-221797, only a combination of segments of the FIFO is changed. Thus, the number of combinations is limited.

SUMMARY OF THE INVENTION

An object of the present invention is to provide a system that uses a VCM with the LRU controlling method that allows channels to be moved among memory masters and automatically assigned thereto in consideration of the access frequency, so that the use efficiency of channels of the VCM is improved, and the memory access performance is improved.

According to a first aspect of the present invention, there is provided a virtual channel memory access controlling circuit for controlling accesses from a plurality of memory masters to a virtual channel memory having a plurality of channels, comprising: a channel information storing portion having a plurality of storage areas, each of the each storage areas being assigned to any of the memory masters, each of the storage areas corresponding to each of the channels, each of the storage areas having a channel number and a memory address, the channel number identifying a channel, the memory address being sent to the virtual channel memory; detecting means for detecting necessity of a change of assignment of storage area between memory masters; and changing means for dynamically changing the assignment of the storage area between memory masters.

According to a second aspect of the present invention, there is provided a virtual channel memory access controlling circuit for controlling accesses from a plurality of memory masters to a virtual channel memory having a plurality of channels, comprising: a channel information storing portion having a plurality of storage areas, each of the each storage areas being assigned to any of the memory masters, each of the storage areas corresponding to each of the channels, each of the storage areas having a memory address to be sent to the virtual channel memory; means for generating channel numbers, each of which identifies a channel which corresponds to each of the storage areas; detecting means for detecting necessity of a change of assignment of storage area between memory masters; and changing means for dynamically changing the assignment of the storage area between memory masters.

The virtual channel memory access controlling circuit according to the first and second aspects may further comprise: a plurality of idle counters, each of which corresponds to each of the respective memory masters, for increasing an idle count when the corresponding memory master is in an idle state and for clearing the idle count when the corresponding memory master accesses the virtual channel memory, wherein the idle count is used as information for determining whether or not the corresponding memory master has not accessed the virtual channel memory for a predetermined time.

The virtual channel memory access controlling circuit according to the first and second aspects may further comprise: a memory master entry portion, when an idle count of any of the idle counters reaches a predetermined value, for enqueuing an identifier of a memory master corresponding to the idle counter concerned with the idle count reaching the predetermined value to a queue; and a move channel controlling portion, when an assignment of any storage area should be changed from a first memory master to a second memory master, for designating, as the first memory master, a master which is identified by the identifier at the top of the queue, and designating, as one or more candidates for the storage area concerned with the change of the assignment, one or more storage areas which are assigned to the designated memory master.

The virtual channel memory access controlling circuit according to the first and second aspects may further comprise: a plurality of LRU controlling portions, each of which corresponds to each of the memory masters, for managing, in LRU system, one or more identifiers of one or more storage areas which have been used for a corresponding memory master to access to the memory master, wherein the move channel controlling portion references identifiers of storage areas managed by the LRU controlling portion for deciding which of storage areas assigned to the first memory master is a target of change of assignment.

The virtual channel memory access controlling circuit according to the first and second aspects may further comprise: a plurality of access counters, each of which corresponds to each of the memory masters, for increasing an access count when a corresponding memory master accesses the virtual memory and for clearing the access count when a the corresponding idle counter is increased, the access count being used as information that represents frequency of accesses from the corresponding memory master to the virtual channel memory, wherein when the queue stores no identifier, the move channel controlling portion designates, as the first memory master, a memory master which corresponds to an access counter of which the access count is minimum.

In the virtual channel memory access controlling circuit according to the first and second aspects, the memory master entry portion may delete an identifier of the memory master which is designated as the first memory master from the queue.

In the virtual channel memory access controlling circuit according to the first and second aspects, the detecting means may detects the necessity of change of assignment of a storage area between memory masters when a channel miss takes place for any memory master, and the second memory master may be a memory master for which the channel miss takes place.

In the virtual channel memory access controlling circuit according to the first and second aspects, if the first memory master is the same as the second memory master, LRU information managed by the LRU managing portion may be changed, and change of assignment of a storage area between memory masters may not be performed.

In the virtual channel memory access controlling circuit according to the first and second aspects, if there are a plurality of access counters whose access counts are the minimum, the move channel controlling portion may designate, as the first memory master, a memory master among masters which correspond to the plurality of access counters whose access counters are the minimum in accordance with a predetermined priority.

These and other objects, features and advantages of the present invention will become more apparent in light of the following detailed description of the best mode embodiment thereof, as illustrated in the accompanying drawings.

BRIEF DESCRIPTION OF DRAWINGS

FIGS. 6A and 6B are a schematic diagrams for explaining assignments of channel information storing areas;

DESCRIPTION OF PREFERRED EMBODIMENTS

Next, with reference to the accompanying drawings, a first embodiment of the present invention will be described.

Figure 4:
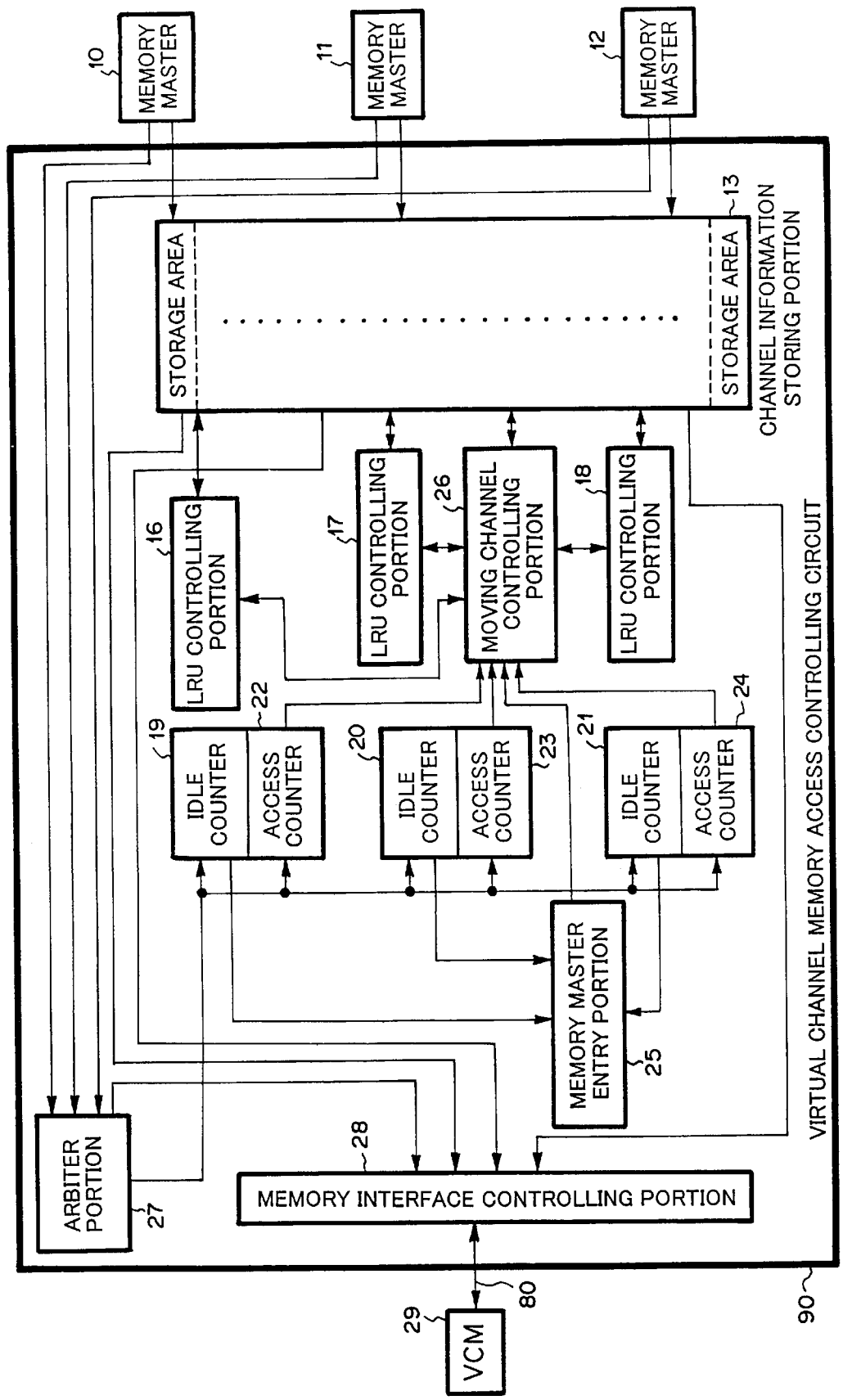
FIG. 4 is a block diagram shows the structure of an embodiment of the present invention.

FIG. 4 is a block diagram showing the structure of the first embodiment of the present invention. Referring to FIG. 4, the first embodiment of the present invention comprises a plurality of memory masters 10, 11, and 12, a VCM 29, a virtual channel memory access controlling circuit 90, and a memory bus 80. Each of the memory masters 10, 11, and 12 issue access requests to the VCM 29. The memory bus 80 connects the VCM 29 and the virtual channel memory access controlling circuit 90.

The virtual channel memory access controlling circuit 90 comprises a channel information storing portion 13, an LRU controlling portion 16, an LRU controlling portion 17, and an LRU controlling portion 18. The channel information storing portion 13 stores a bank address, a row address, a column address, a segment address, and a channel number (these information is referred to as channel information as a whole) of a cycle generated by each of the memory masters 10, 11, and 12. The LRU controlling portion 16 corresponds to the memory master 10. The LRU controlling portion 17 corresponds to the memory master 11. The LRU controlling portion 18 corresponds to the memory master 12. The LRU controlling portions 16, 17, and 18 control channel information based on the LRU method.

The virtual channel memory access controlling circuit 90 also comprises idle counters 19, 20, and 21. When the memory master 10 is in an idle state, the idle counter 19 is increased with a control clock (not shown). When the memory master 10 issues an accesses request, the count of the idle counter 19 is cleared. When the memory master 11 is in an idle state, the idle counter 20 is increased with the control clock. When the memory master 11 issues an accesses request, the count of the idle counter 20 is cleared. When the memory master 12 is in an idle state, the idle counter 21 is increased with the control clock. When the memory master 12 issues an accesses request, the count of the idle counter 21 is cleared.

The virtual channel memory access controlling circuit 90 further comprises access counters 22, 23, and 24. When the memory master 10 issues an access request, the access counter 22 is increased. When the count of the idle counter 19 reaches a predetermined value, the count of the access counter 22 is cleared. When the memory master 11 issues an access request, the access counter 23 is increased. When the count of the idle counter 20 reaches a predetermined value, the count of the access counter 23 is cleared. When the memory master 12 issues an access request, the access counter 23 is increased. When the count of the idle counter 21 reaches a predetermined value, the count of the access counter 23 is cleared.

The virtual channel memory access controlling circuit 90 still further comprises a memory master entry portion 25, a moving channel controlling portion 26, an arbiter portion 27, and a memory interface controlling portion 28. When the count of the idle counter 19, 20, or 21 reaches a predetermined value, the memory master entry portion 25 enqueues an identifier of the corresponding memory master 10, 11, or 12 to a queue therein. In response to an occurrence of a channel miss, the moving channel controlling portion 26 controls a change of an assignment of a channel 50 to the memory master 10, 11, or 12 on the basis of information of the access counters 22, 23, and 24 and information of the memory master entry portion 25. The channel miss represents that the bank address, the row address, and the segment address of an access request issued from a memory master (the memory master 10, 11 or 12) matches none of the bank addresses, the row addresses, and the segment addresses of channel information stored in storage areas of the channel information storing portion 13 which is assigned to the memory master (the memory masters 10, 11 or 12). The arbiter portion 27 arbitrates access requests issued from the memory masters 10, 11, and 12. The memory interface controlling portion 28 generates a cycle on the memory bus 80 corresponding to the arbitrated result of the arbiter portion 27 and the address in the channel information in the channel information storing portion 13.

The number of storage areas in the channel information storing portion 13 is the same as the number of the channels 50 in the VCM 29. Thus, each storage area corresponds to each channels 50. Each storage area is dynamically assigned to one of the memory masters 10, 11, and 12.

However, besides the memory masters 10, 11, and 12, other memory masters (not shown) are connected. Thus, the virtual channel memory access controlling circuit 90 also comprises LRU controlling portions, idle counters, and access counters corresponding to those memory counters. For easy understanding, the description of those portions is omitted.

Figure 1:
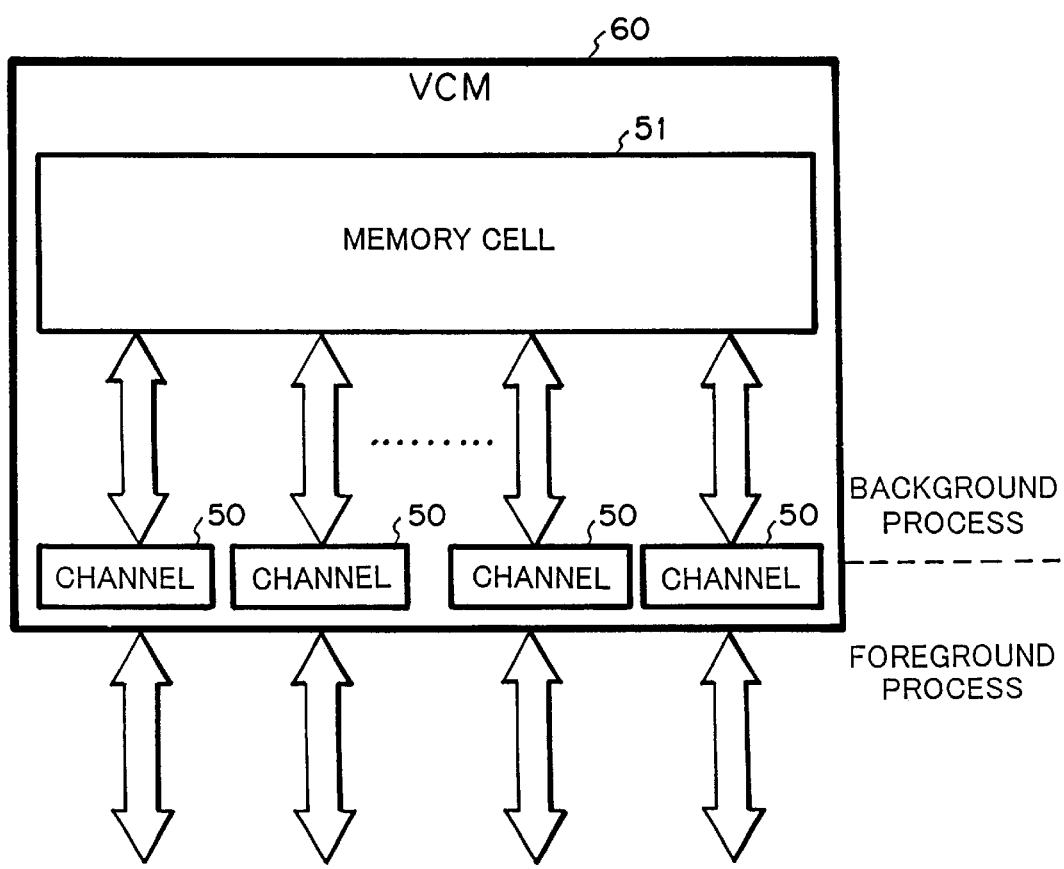
FIG. 1 is a block diagram showing the concept of a VCM.
Figure 2:
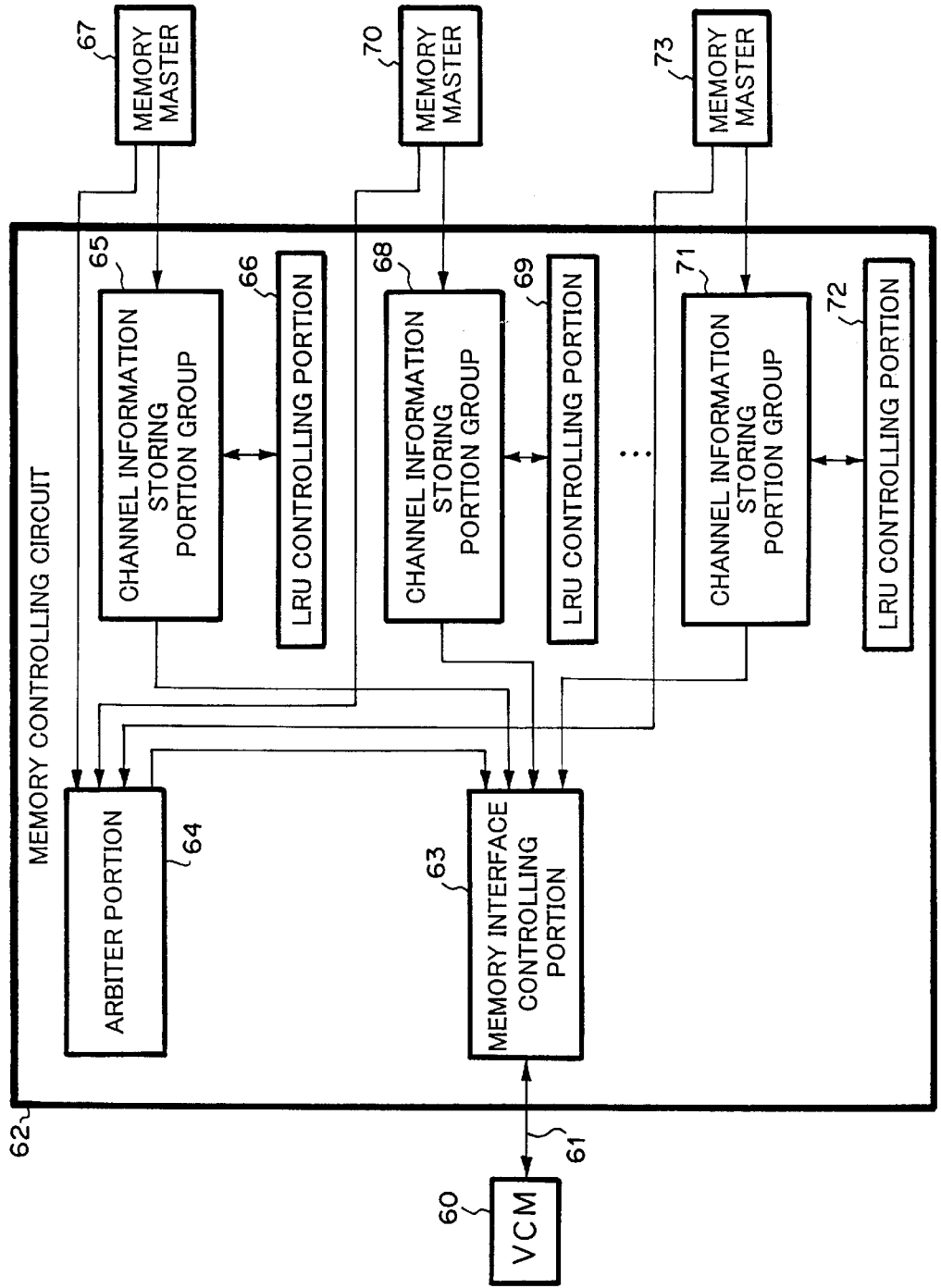
FIG. 2 is a block diagram showing the structure of a memory system using a conventional VCM.
Figure 3:
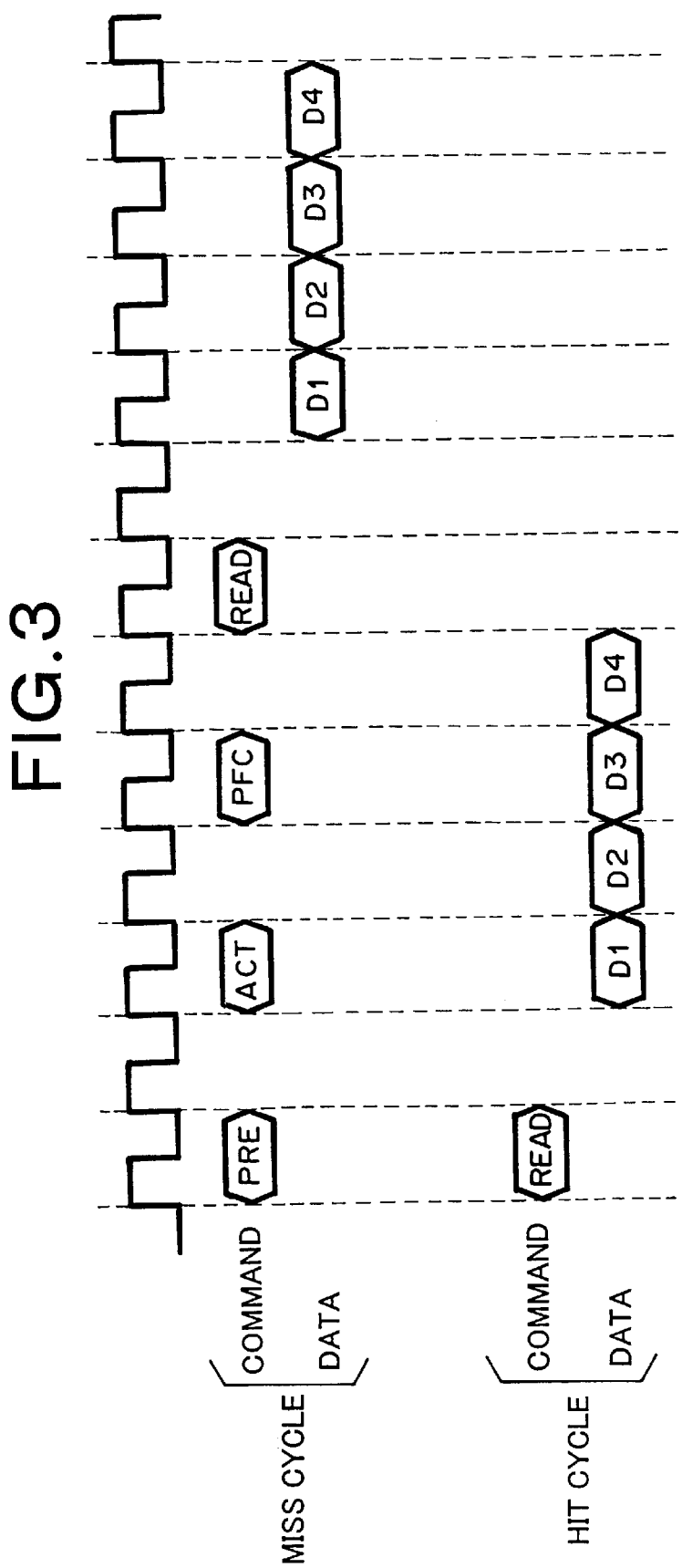
FIG. 3 is a time chart showing an access to the VCM.

As shown in FIG. 1, the VCM 29 comprises a plurality of channels 50 and a memory cell 51. The memory cell 51 is composed of a plurality of segments. The channels 50 are composed of for example registers. Each channel 50 is connected to all the segments. Each channel 50 stores data for one segment. Each segment is uniquely designated by a bank address, a row address, and a segment address. Data of one segment that is read from the memory cell 51 is held in one channel 50 until the data is rewritten in read mode. In addition, data that is written from the virtual channel memory access controlling circuit 90 is held in a channel 50 until the data is rewritten in write mode.

Figure 5:
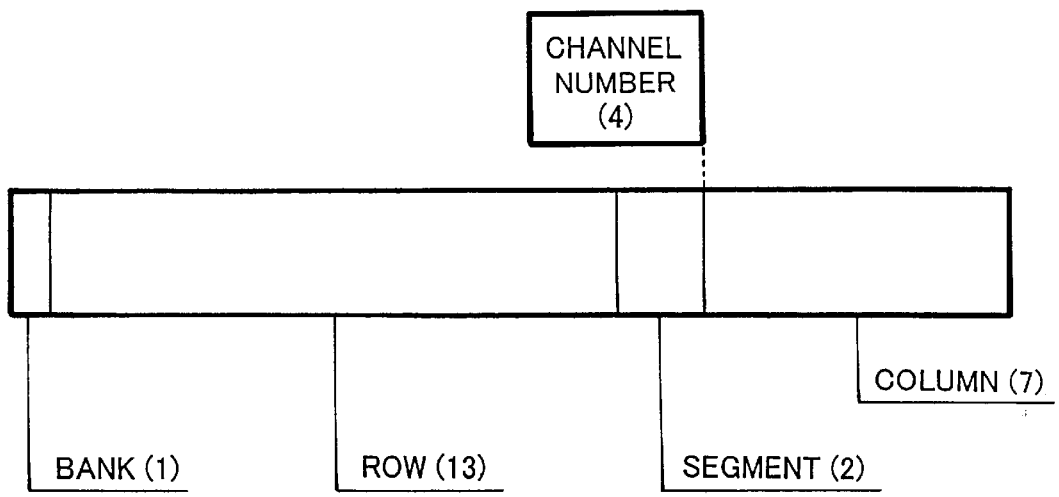
FIG. 5 is a schematic diagram for explaining channel information.

As shown in FIG. 5, a memory address consists of a bank address (1 bit), a row address (13 bits), a segment address (2 bits) that represents a segment unit, and a column address (7 bits), for example. The channel information consists of a memory address and a channel number. The memory master 10, 11, and 12 sends the bank address, the row address, the segment address, and the column address to each storage area of the channel information storing portion 13.

All the channels 50 are assigned unique channel numbers. When there are channels 50 as many as 16, each channel number is composed of 4 bits. The channel information storing portion 13 has storage areas for identifying the channels 50 assigned thereto. For example, referring to FIG. 6A, the storage areas 0 to 2 of the channel information storing portion 13 stores channel information of channels 50 corresponding to the memory master 10; the storage areas 3 and 4 store channel information of channels 50 corresponding to the memory master 11; the storage areas 12 to 15 store channel information of channels 50 corresponding to the memory master 12. In this example, the channel numbers 0 to 15 correspond to the storage areas 0 to 15, respectively.

When the system is initialized, the channel numbers 0 to 15 are generated and stored as part of channel information in the storage areas 0 to 15, respectively.

Figure 7:
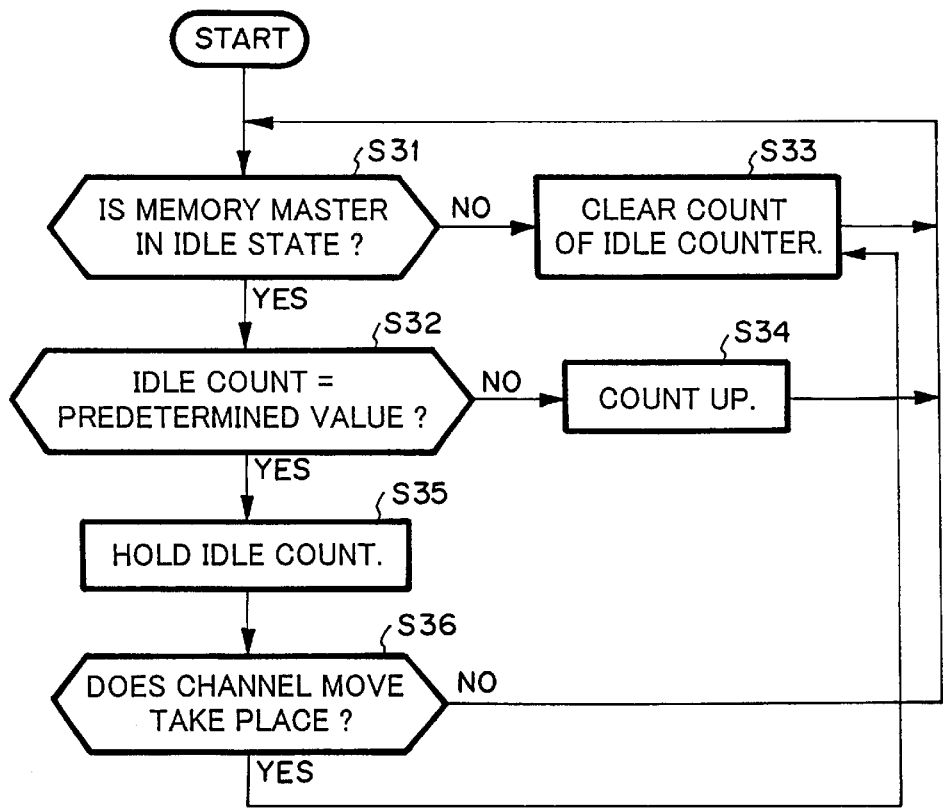
FIG. 7 is a flow chart showing the operation of an idle counter shown in FIG. 4.

The storage areas 0 to 15 have respective valid flags (not shown). Each valid flag represents whether or not channel information in the corresponding storage area is valid. When the system is initialized, the valid flags are reset. When channel information is stored to a storage area, the relevant valid flag is set. When channel information is deleted from a storage area, the relevant valid flag is reset again. Since the operation of the valid flag is the same as that used in a normal caching process, the description is omitted FIG. 7 is a flow chart for explaining the operations of the idle counters 19, 20, and 21. Referring to FIG. 7, when a memory master (the memory master 10, 11 or 12) is in an idle state (Yes at step S31), the corresponding idle counter (the idle counter 19, 20 or 21) is increased with the control clock (at step 34) until the count thereof becomes a predetermined value (No at step S32). When the memory master (the memory master 10, 11,or 12) is in the idle state (Yes at step S31), if the count is the predetermined value (Yes at step S32), the count is held (at step S35). On the other hand, when the memory master (the memory master 10, 11, or 12) issues an access request (No at step S31) or when a channel moves (Yes at step S36) takes place, the counts of the idle counter (the idle counter 19, 20, or 21) is cleared (at step S33). As a result, it can be determined whether or not the memory master has not issued an access request for a long time.

Figure 8:
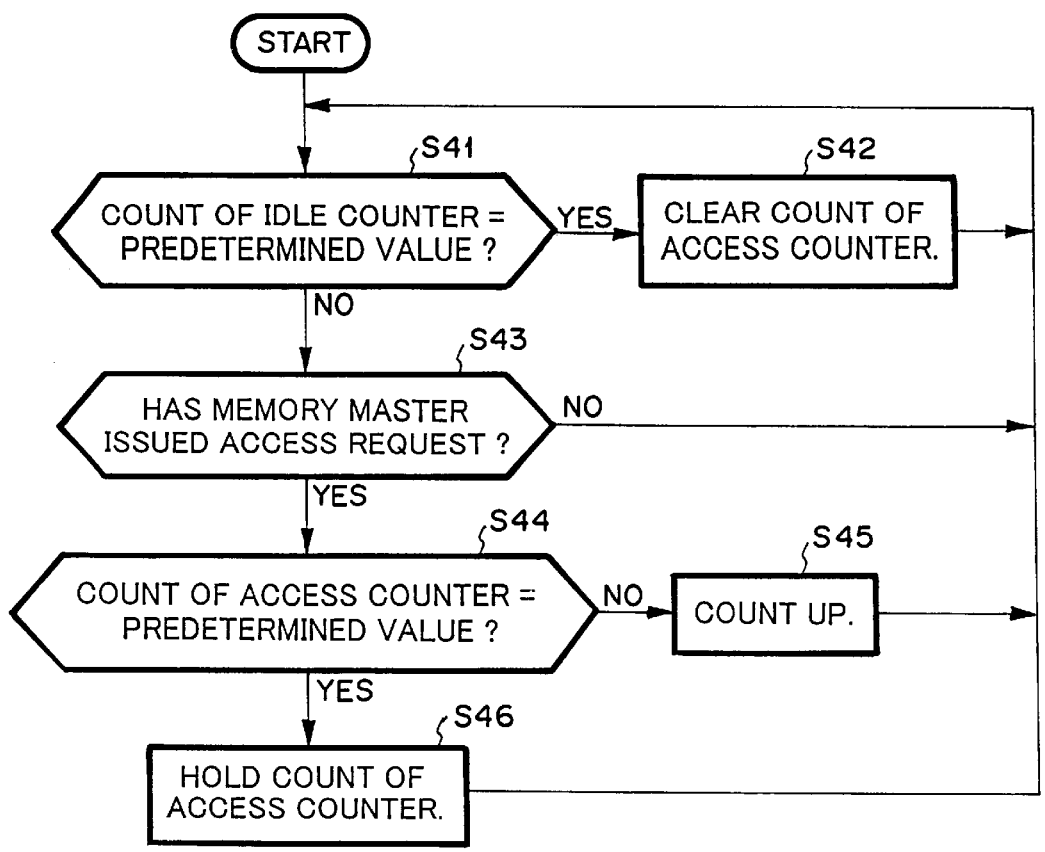
FIG. 8 is a flow chart showing the operation of an access counter shown in FIG. 4.

FIG. 8 is a flow chart for explaining the operations the access counters 22, 23, and 24. Referring to FIG. 8, when a memory master (the memory master 10, 11, or 12) issues an access request (Yes at step S43), if the count of the corresponding counter (the access counter 22, 23, or 24) is not a predetermined value (No at step S44), the access counter is increased (at step S45). Otherwise (Yes at step S44), the count of the access counter is held (at step S46). When the count of the corresponding idle counter (the idle counter 19, 20, or 21) becomes a predetermined value (Yes at step S41), the count of the access counter (the access counter 22, 23, or 24) is cleared (at step S42).

Figure 9:
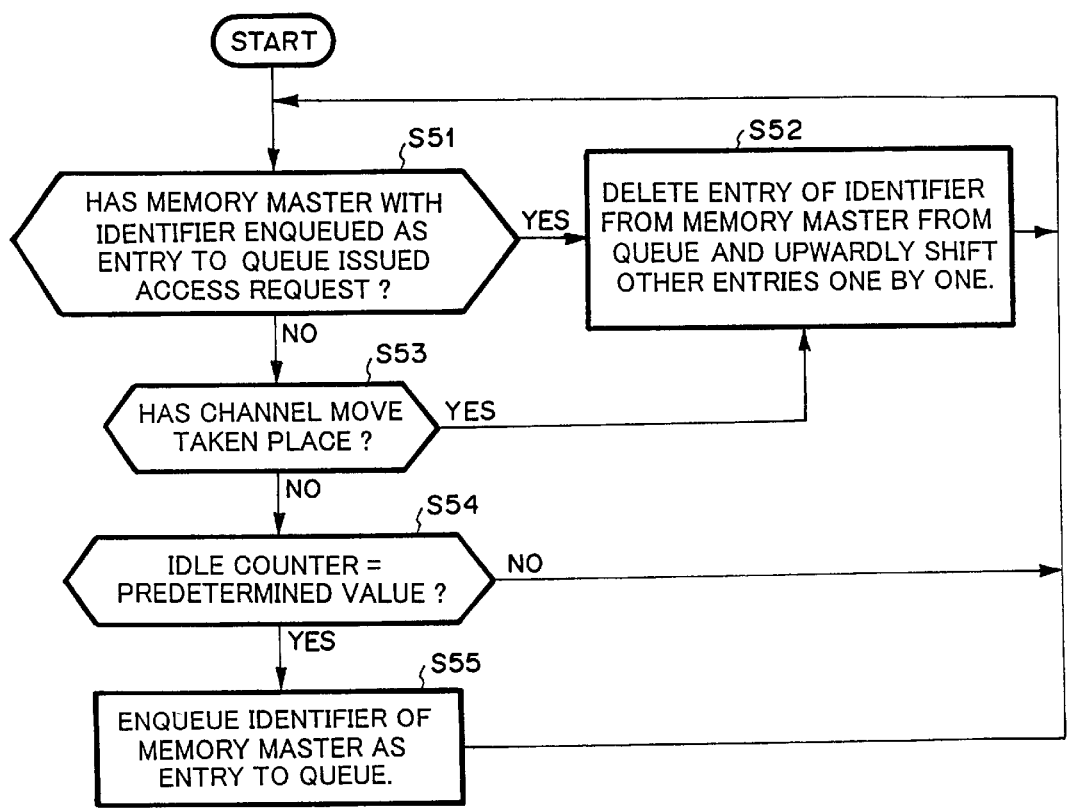
FIG. 9 is a flow chart showing the operation of a memory master entry portion shown in FIG. 4.

FIG. 9 is a flow chart for explaining the operation of the memory master entry portion 25. Referring to FIG. 9, when a count of an idle counter (the idle counter 19, 20, or 21) becomes a predetermined value (Yes at step S54), the memory master entry portion 25 enqueues an identifier of a corresponding memory master (the memory master 10, 11, or 12) to a queue therein (at step S55). Thus, when a channel move is required due to an occurrence of a channel miss or the like, channel information on a channel to be moved with priority can be obtained. In other words, a memory master with the identifier that is placed at the beginning of the queue is a memory master from which a channel is removed with a priority. When a memory master (the memory master 10, 11, or 12) whose identifier has been enqueued in the queue of the memory master entry portion 25 issues an access request (Yes at step S51) or when a channel move takes place for the memory master (Yes at step S53), the entry of the identifier of the memory master is removed from the queue (at step S52). If a void entry arises in the queue of the memory master entry portion 25 as a result of the removal, the following entries are upwardly shifted by one.

Figure 10:
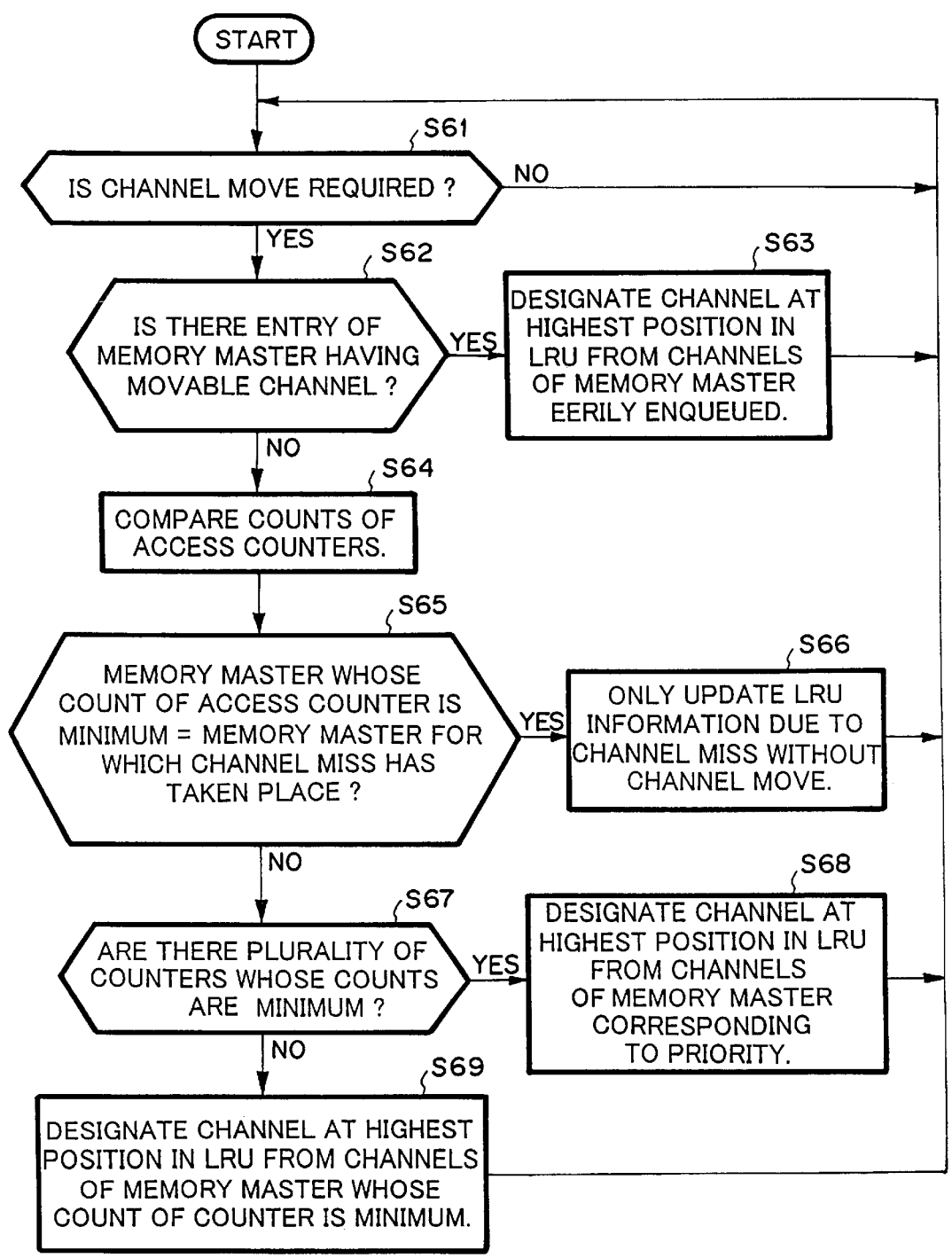
FIG. 10 is a flow chart showing the operation of a moving channel controlling portion shown in FIG. 4.

FIG. 10 is a flow chart for explaining the operation of the moving channel controlling portion 26. Referring to FIG. 10, when a channel 50 should be moved from a master memory to another master memory due to an occurrence of a channel miss or the like, the moving channel controlling portion 26 controls which channel assigned to which memory master should be reassigned to the latter memory master on the basis of the counts of the access counters 22, 23, and 24, the identifiers of the memory masters enqueued in the queue of the memory master entry portion 25, and the LRU information of the storage areas assigned to the memory masters managed by the LRU controlling portion 16, 17, and 17.

When a channel move is required (Yes at step S61) due to, for example, a channel miss, if the queue of the memory master entry portion 25 has at least an entry of an identifier of a memory master (the memory master 10, 11, or 12) having a movable channel (Yes at step S62), the moving channel control portion 26 designates the memory master (the memory master 10, 11, or 12) whose identifier was enqueued earliest in the queue of the memory master entry portion 25 and then designates the channel which is at the highest rank in the corresponding LRU controlling portion (the LRU controlling portion 16, 17, or 18) among one or more channels which are assigned to the memory master (step 63).

When a channel move is required (Yes at step S61), if the memory master entry portion 25 does not have an entry of an identifier of a memory master (the memory master 10, 11, or 12) having a movable channel (No at step S62), moving channel controlling portion 26 compares the counts of the access counters 22 to 24 one another (at step S64). If the memory master (the memory master 10, 11 or 12) which the count of the access counter (the access counter 22, 23 or 24) corresponding to is the minimum is the same as the memory master (the memory master 10, 11 or 12) for which a channel miss has taken place (Yes at step S65), the moving channel controlling portion 26 updates the corresponding LRU controlling portion (the LRU controlling portion 16, 17 or 18) without performing a channel move (at step S66). The updating the corresponding LRU controlling portion comprises rewriting the bank address, the row address, the column address, and the segment address written in an entry at the highest rank of the LRU controlling portion to those that are input from the memory master, placing the bank address, the row address, the column address, and the segment address that are input from the memory master at the lowest rank, and upwardly shifting the ranks of the other bank addresses, row addresses, column addresses, and segment addresses upward.

If the memory master (the memory master 10, 11 or 12) which the count of the access counter (the access counter 22, 23 or 24) corresponding to is the minimum is the same as the memory master (the memory master 10, 11 or 12) for which a channel miss has taken place (No at step S65), the moving channel controlling portion 26 determines whether or not the minimum count is shared by two or more access counters among the access counters 22, 23, and 24 (at step S67). If Yes at step S67, the moving channel controlling portion 26 designates the memory master (the memory master 10, 11, or 12) whose priority is the highest and then designates the channel which is at the highest rank in the corresponding LRU controlling portion (the LRU controlling portion 16, 17, or 18) among one or more channels which are assigned to the memory master (step 68). Here, priorities of the memory masters 10, 11, 12 have been determined beforehand. If No at step S67, the moving channel controlling portion 26 designates the memory master (the memory master 10, 11, or 12) which the count of the access counter corresponding to is the minimum and then designates the channel which is at the highest rank in the corresponding LRU controlling portion (the LRU controlling portion 16, 17, or 18) among one or more channels which are assigned to the memory master (step 69).

Next, the operation of the first embodiment of the present invention will be described. The description of memory masters other than the memory masters 10, 11, and 12 is omitted.

First of all, a case where the memory master 10 issues an access request will be described.

The access request signal is input to the arbiter portion 27. When the arbiter portion 27 permits the access request, a bank address, a row address, a column address, and a segment address accompanying the access request are stored to a storage area of the channel information storing portion 13 which is assigned to the memory master 10. At this point, the idle counter 19 is increased by one, and the count of the idle counter 19 is cleared. The LRU controlling portion 16 moves the identifier of the storage area that has stored the bank address, the row address, the column address, and the segment address to the lowest rank. Here, the identifier of the storage are is equivalent with the channel number. In addition, the LRU controlling portion 16 upwardly shifts the ranks of the identifiers of the other two storage areas by one.

The memory interface controlling portion 28 generates a cycle on the memory bus 80 with the channel number, and the bank address, the row address, the column address and the segment address accompanying the access request. After the cycle is completed, the idle counter 19 is re-increased with the control clock. When a plurality of memory masters issue access requests at the same time, the arbiter portion 27 designates the access order of the access requests corresponding to the pre-designated priority.

If the segment designated by the bank address, the row address, and the segment address of the cycle of the access request match a segment designated by a bank address, a row address, and a segment address stored in one of the three storage areas 0 to 2 of the channel information storing portion 13, LRU controlling portion 16 processes the cycle as a channel hit. At that point, if the identifier of the storage area that stores the matched access information is not at the lowest rank, the LRU controlling portion 16 moves the identifier to the lowest rank, and upwardly shifts the ranks of the identifiers of the other two storage areas by one.

In contrast, if the segment designated by the bank address, the row address, and the segment address of a cycle of an access request matches none of segments designated by bank addresses, row addresses, and segment addresses stored in the three storage areas 0 to 2 of the channel information storing portion 13, the LRU controlling portion 16 processes the cycle as a channel miss. At that point, the LRU controlling portion 16 stores the bank address, the row address, the column address, and the segment address accompanying the access request to a storage area at the highest rank. In addition, the LRU controlling portion 16 moves the storage area to the lowest rank.

When the memory master 10 does not issue an access request, the idle counter 19 is continuously increased until the count becomes a predetermined value. The predetermined value is set so that it is suitable judged that the memory master has not issued an access request for a long time. When the count of the idle counter 19 reaches a predetermined value, the idle counter 19 stops counting and holds the predetermined value, and the access counter 22 is cleared. In addition, when the count of the idle counter 19 reaches the predetermined value, it is determined that the memory master 10 has not issued an access request for a long time. Therefore, it is determined that an storage area corresponding to an identifier placed at the highest rank in the LRU controlling portion 16 can be moved to another memory master. Thus, the identifier of the memory master 10 is enqueued to the queue of the memory master entry portion 25.

If the memory master 10 issues an access request after the identifier thereof has been enqueued, the identifier is deleted from the queue of the memory master entry portion 25, the idle counter 19 is cleared, and the count of the access counter 22 is increased by 1.

Provided that the identifier of the memory master 10 has been enqueued as an entry to the queue of the memory master entry portion 25, if the memory master 11 issues an access request and a channel miss takes place in the cycle, since the identifier of the memory master 10 that has a movable channel has been enqueued as an entry to the queue of the memory master entry portion 25, the moving channel controlling portion 26 designates as a movable channel the channel corresponding to the storage area corresponding to the identifier at the highest rank in the LRU controlling portion 16 among channels corresponding to the storage areas 0 to 2 in the channel information storing portion 13 assigned to the memory master 10.

The storage area designated by the channel information storing portion 13 is assigned to the memory master 11 (for example, the storage area 2 is assigned to the memory master 11 as shown in FIG. 6B). The LRU controlling portion 17 adds one storage area to the existing two storage areas and positions the identifier of the added storage area at the lowest rank in the LRU control.

On the other hand, the LRU controlling portion 16 deletes one of the existing three channels. After the channel move is completed, the identifier of the memory master 10 is deleted from the queue of the memory master entry portion 25. In addition, the idle counter 19 is cleared for the next enqueuing operation.

When identifiers of a plurality of memory masters have been enqueued to the queue of the memory master entry portion 25 and a channel move is required due to an occurrence of a channel miss or the like, the moving channel controlling portion 26 designates a memory master that has been first enqueued to the memory master entry portion 25 as a memory master which has a movable channel. When the identifier of the designated memory master is deleted from the queue after the channel move has been completed, the memory master entry portion 25 upwardly shift the entry positions of the remaining identifiers of the memory masters by one to prepare for the next channel move.

If at least one identifier of a memory master has been enqueued to the queue of the memory master entry portion 25 when a channel move is required, a channel move is performed in such a manner. However, there may be a case where no identifier has been enqueued to the queue of the memory master entry portion 25 when a channel move is required.

Such a case is caused, for example, when a channel miss is caused on the ground of that all the memory masters 10, 11, and 12 periodically issue access requests with a period in which the idle counters 19, 20, and 21 do not reach the predetermined value, and a segment designated by a bank address, a row address, and segment address issued by each memory master varies every time the memory master issues an access request.

In such a case, the moving channel controlling portion 26 compares the counts of the access counters 22, 23, and 24 to designate a memory master for which the count is minimum as a memory master which has a movable channel. Thereafter, the moving channel controlling portion 26 designates the channel which is at the highest rank in the corresponding LRU controlling portion among one or more channels which are assigned to the memory master. Thus, the excessive number of channels (the excessive number of storage areas) is adjusted to the adequate number of channels (the adequate number of storage areas) for a memory master which has not been enqueued in the queue in the memory master entry portion 25 no matter the overall frequency of the memory access from the memory master is low for a reason that the memory master has been issued access requests with periods in which a relevant idle counter does not reach the predetermined value.

When there are a plurality of memory masters whose counts are the minimum, a memory master corresponding to the designated priority is designated as a memory master which has a movable channel.

However, if any one of the following two conditions is satisfied, LRU information is updated in the LRU controlling portion concerned, and the channel move is not performed. The first condition is that the number of memory masters for which the count of the corresponding access counter is the minimum is one and the memory master for which a channel miss takes place and the memory master for which the count of the corresponding access counter is the minimum is the same. The second condition is that the number of memory masters for which the count of the corresponding access counter is the minimum is more than one and the memory master for which a channel miss takes place and any one of the memory masters for which the counts of the corresponding access counters are the minimum is the same. As described above, the updating URL information comprises rewriting channel information at the highest rank with channel information supplied from a memory master, positioning the channel information supplied from the memory master to the lowest rank, and shifting the other channel information upwardly by one.

Thus, even if the number of channels assigned to each memory master is improper, more storage areas can be automatically assigned to a memory master that issues more access requests, whereas less storage areas can be automatically assigned to a memory master that issues less access requests. As a result, many channels can be assigned to a memory master that issues many access requests, thereby lowering the probability of a channel miss. In other words, the probability of a channel hit can be improved. Thus, the overall memory access performance can be improved.

Once the virtual channel memory access controlling circuit 90 issues an access request to the VCM 29, data that is read/written from/to VCM 29 is stored in a relevant channel 50. The VCM 29 holds a bank address, a row address, and a segment address corresponding to data stored in the channels 50. When a read request is issued to the same address at which data is stored, the VCM 29 sends the data stored in the channel 50 to the virtual channel memory access controlling circuit 90 rather than accessing the memory cell 51.

Figure 11:
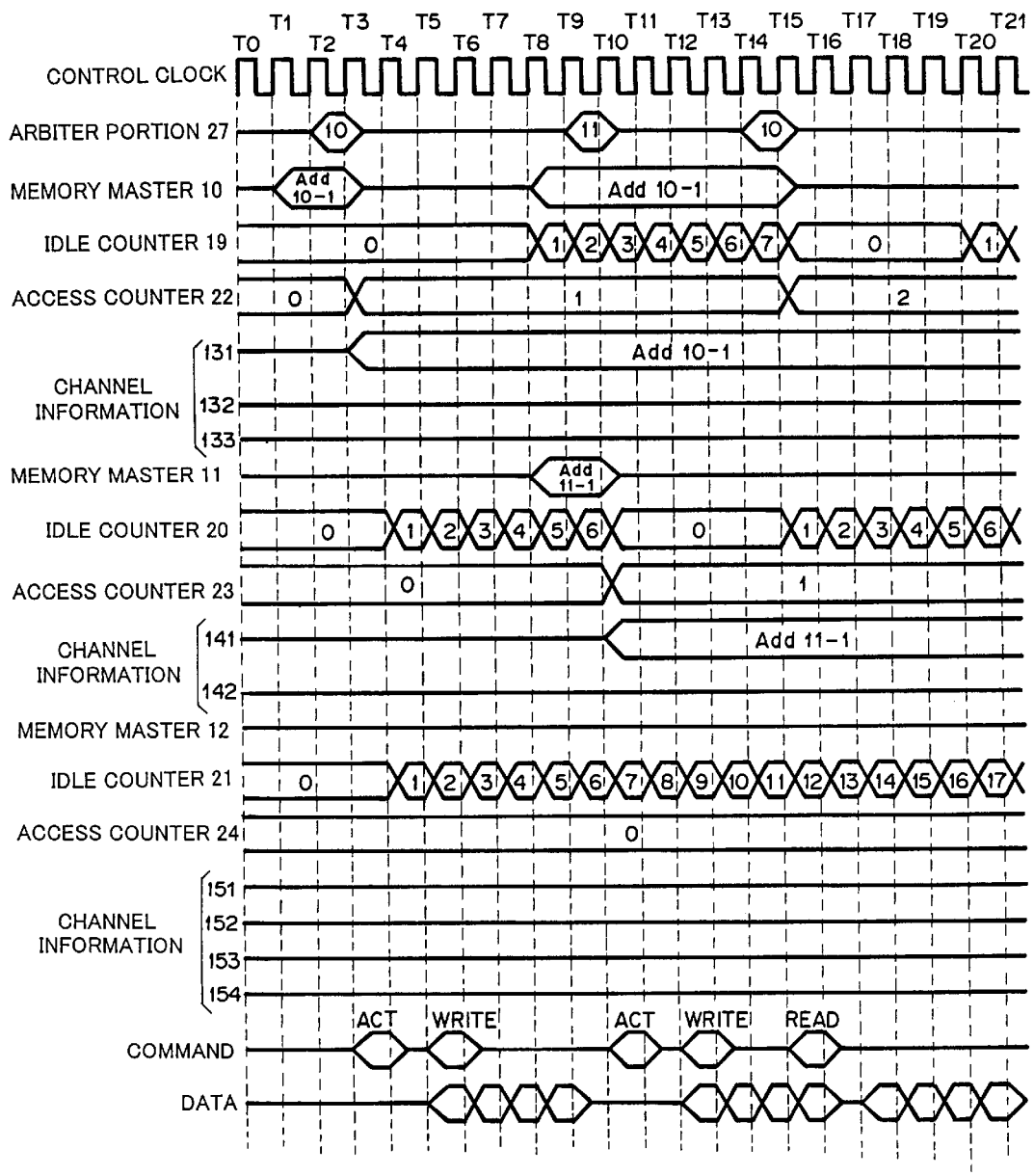
FIG. 11 is a first time chart showing the operation of the embodiment of the present invention.
Figure 12:
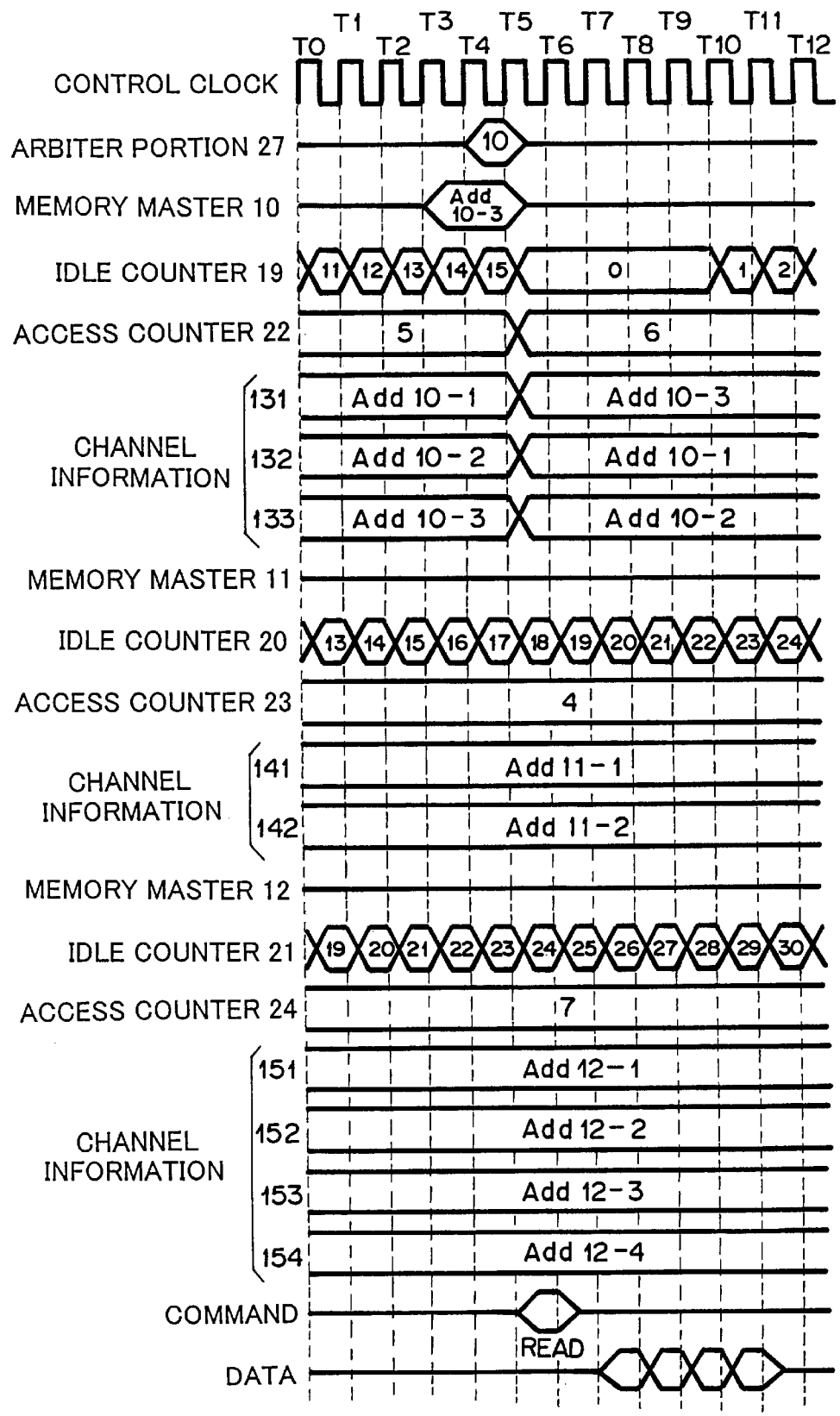
FIG. 12 is a second time chart showing the operation of the embodiment of the present invention.
Figure 13:
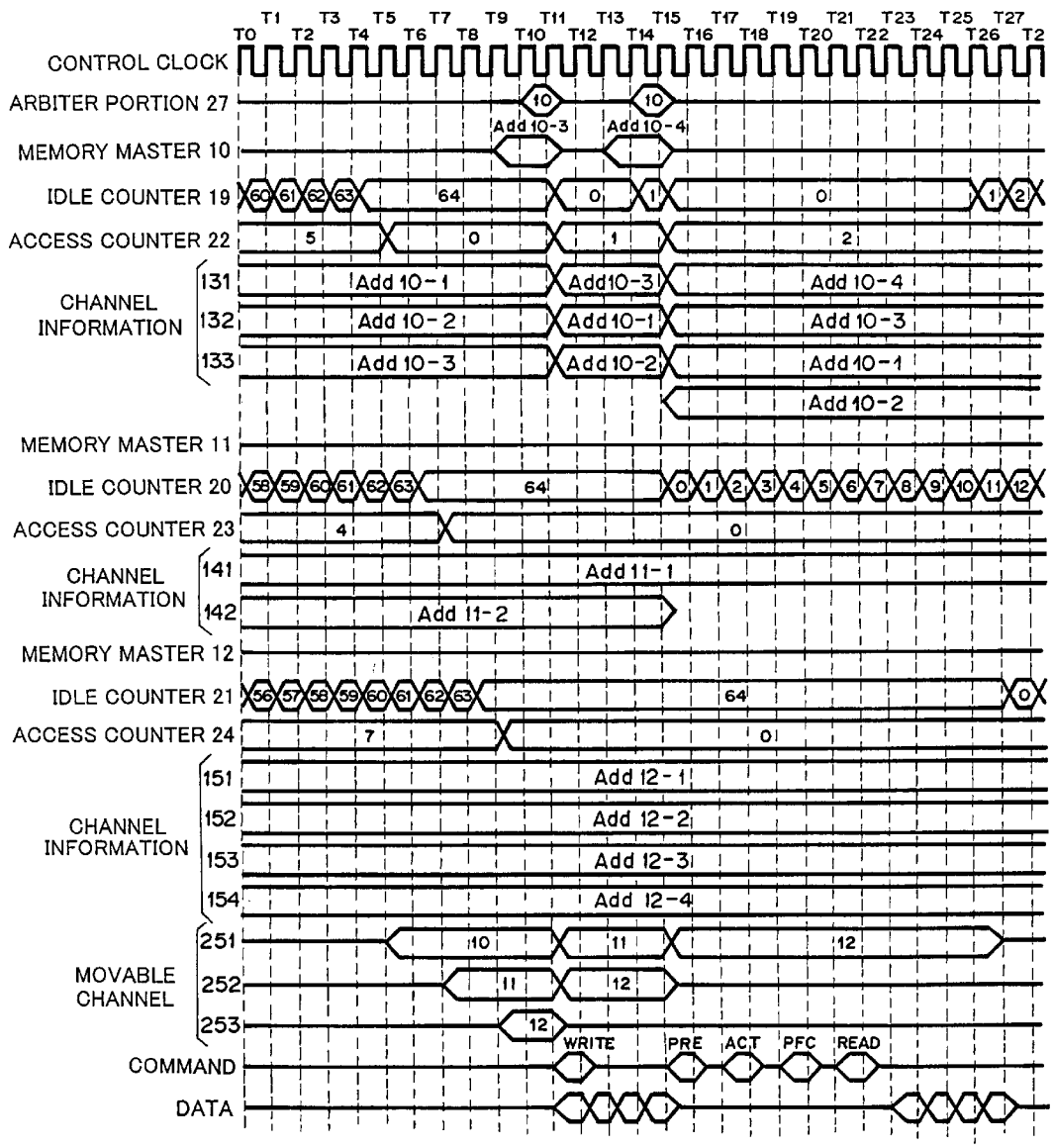
FIG. 13 is a third time chart showing the operation of the embodiment of the present invention.
Figure 14:
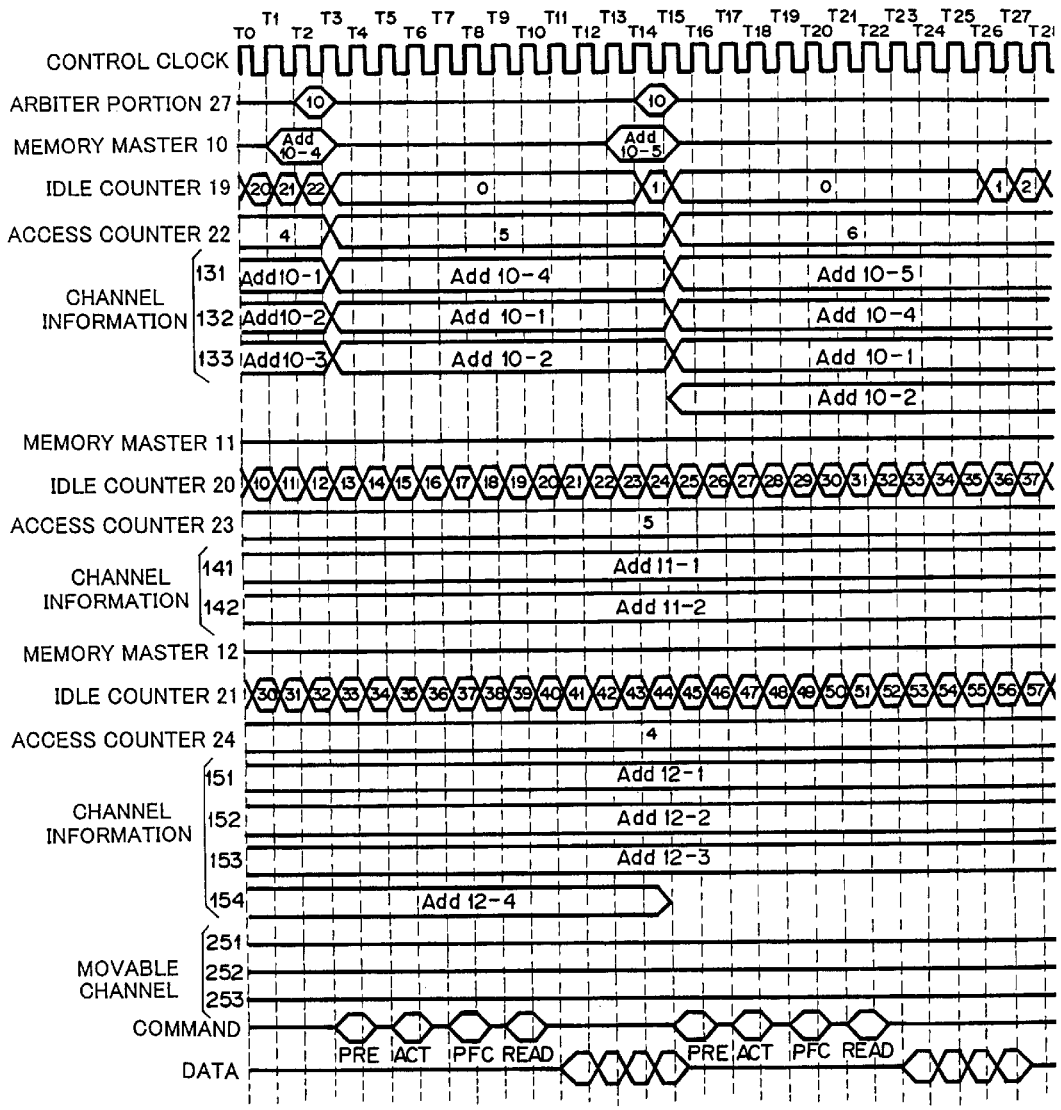
FIG. 14 is a fourth time chart showing the operation of the embodiment of the present invention.

Next, with reference to FIGS. 11 to 14, the operation of the first embodiment of the present invention will be described. FIG. 11 is a time chart showing the operation of the first embodiment of the present invention. FIG. 12 is a time chart showing the LRU controlling operation of the channel information storing portion 13. FIG. 13 is a time chart showing the operations of the memory master entry portion 25 and the moving channel controlling portion 26. FIG. 14 is a time chart showing the channel moving operation in the case where the memory master entry portion 25 does not have an entry.

In FIGS. 11 to 14, channel information 131, 132, and 133 represent channel information in the lower LRU (least recently used) order of the LRU controlling portion 16. Likewise, channel information 141 and 142 represent channel information in the lower LRU order of the LRU controlling portion 17. Channel information 151, 152, 153, and 154 represent channel information in the lower LRU order of the LRU controlling portion 18. Movable channels 251, 252, and 253 represent entries in the memory master entry portion 25. The entries will be deleted from the memory master entry portion 25 in the higher order.

Next, the operations of the memory masters 10 to 12, the idle counters 19 to 21, the access counters 22 to 24, and the channel information storing portion 13 will be described.

Referring to FIG. 11, in the initial state, three channels 50 are assigned to the memory master 10; two channels 50 are assigned to the memory master 11; and four channels 50 are assigned to the memory master 12. In addition, the channel information storing portion 13 has storage areas corresponding to the memory masters 10, 11, and 12 as shown in FIG. 6A. Each storage area contains its channel number as part of channel information.

In the initial state, channel information is not stored in the channel information storing portion 13 except for channel numbers (at T0). In a period after the power of the system is turned on and before the memory master 10 (11 or 12) issues an access request, even if the memory master 10 (11 or 12) is in an idle state, the idle counter 19 (20 or 21) is not increased.

In such a state, the memory master 10 issues an access request (at T1). The access request is issued along with a memory address add 10-1. Although the address contains a bank address, a row address, a storage area, and a column address, it is assumed that identified by the address add 10-1 are only a bank address, a row address, and a segment address to simplify explanation. Since channels are assigned to memory masters by the virtual channel memory access controlling circuit 90, the address add 10-1 does not contain a channel address.

When the arbiter portion 27 permits the access request issued from the memory master 10, the access request ceases (at T2). Thus, the arbiter portion 27 adds "10" (that represents the memory master 10) to the permission signal. At that time, the access counter 22 is increased by 1. The count of the access counter 22 becomes "1". The address add 10-1 is stored to the storage area 0 in the channel information storing portion 13. The storage area 0 is ranked at the lowest position in the LRU controlling portion 16. In addition, a cycle is generated on the memory bus 80 (at T3). In the example, a write cycle is generated for a memory in which no row address is activated from an initial state. Therefore, a row address is activated by an ACT command (at T4), and data are written by WRITE command (at T5 to -T8).

After the power of the system is turned on, when it is determined that any memory master (in the example, the memory master 10) issues an access request (at T3), the idle counter 20 and the idle counter 21 corresponding to the memory masters 11 and 12 that have not issued access requests are increased (at T4).

After the cycle for the memory master 10 is completed and the memory master 10 becomes an idle state, the idle counter 19 is increased (at T8).

Thereafter, the memory master 10 and the memory master 11 issue access requests at the same time (at T8). Since the arbiter portion 27 has assigned a higher priority level to the memory master 11 than the memory master 10, the arbiter portion 27 permits the access request from the memory master 11 (at T9). Since the arbiter portion 27 has permitted the access request of the memory master 11 (at T9), the memory master 11 ceases issuing the access request (at T11). However, since the access request from the memory master 10 has not been permitted, the memory master 10 continues to issue an access request.

When the access request of the memory master 11 is permitted, the idle counter 20 is cleared. The count of the access counter 23 is increased by 1. Thus, the count of the access counter 23 becomes "1". An address add 11-1 is stored to the storage area 3 in channel information storing portion 13 The storage area 3 is ranked at the lowest position in the the LRU controlling portion 17. A required cycle is generated on the memory bus 80 (at T1). After the cycle for the memory master 11 is completed and the memory master 11 becomes an idle state, the idle counter 20 resumes counting (at T15).

When the arbiter portion 27 permits the access request from the memory master 10 which was issued simultaneously with the access request from the memory master 11 (at T14), the memory master 10 ceases issuing the access request (at T15). The idle counter 19 is cleared. The access counter 22 is increased by 1. Thus, the count of the access counter 22 becomes "2" (at T15).

The address add 10-1 of the present access request from the memory master 10 is identical with the address add 10-1 of the previous access request from the memory master 10. The address add 10-1 has been stored in the storage area in the channel information storing portion 13 as represented by channel information 131 in FIG. 11. Thus, it is determined that a memory hit arises for this cycle from the memory master 10 is. Thus, the contents of the channel information storing portion 13 does not vary. A hit cycle is generated on the memory bus 80 (at T15). In this example, it is assumed that this cycle is a read cycle. Thus, only a READ command for the hit cycle is generated on the memory bus 80 (at T15). After the cycle for the memory master 10 is completed and the memory master 10 becomes an idle state, the idle counter 19 resumes counting (at T20).

Next, the operations of the channel information storing portion 13 and the LRU controlling portions 16 to 18 will be described.

Referring to FIG. 12, at T0, all the memory masters 10 to 12 are in idle states. Since the memory master 10 has generated five cycles, the count of the access counter 22 is "5". The storage areas 0 to 2 in the channel information storing portion 13 store addresses add 10-1, add 10-2, and add 10-3 in the higher LRU order. In other words, the address of the cycle most recently generated from the memory master 10 is add 10-1. The address of the cycle next recently generated from the memory master 10 is add 10-2. Since the value of the idle counter 19 at T0 is "11", 11 clocks have been generated after the last access cycle from the memory master 10.

Likewise, at T0, the count of the idle counter 20 is "13". The count of the access counter 23 is "4". Addresses add 11-1 and add 11-2 are stored in the storage areas 3 and 4 in the channel information storing portion 13, respectively. The count of the idle counter 21 is "19". The count of the access counter 24 is "7". Addresses add 12-1 to 12-4 are stored in the storage areas 12 to 15 in the channel information storing portion 13, respectively.

A case where the memory master 10 issues an access request (at T3) and the address is add 10-3 upon the above state will be described. When the arbiter portion 27 permits the access request from the memory master 10 (at T4), the memory master 10 ceases issuing the access request (at T5). The idle counter 19 is cleared. The access counter 22 is increased by 1. Thus, the count of the access counter 22 becomes "6" (at T5).

The address of the issued access request is add 10-3. The address add 10-3 matches the memory address in the storage area 2 in the channel information storing portion 13. The storage area 2 is positioned at the highest rank in the LRU controlling portion 16. Thus, the LRU controlling portion 16 shifts the channel information in the address add 10-3 at the lowest ranks, upwardly shifts the addresses add 10-1 and add 10-2 by one, and generates a hit cycle on the memory bus 80 (at T5). After the cycle for the memory master 10 is completed and the memory master 10 becomes an idle state, the idle counter 19 is resumes counting (at T10).

Next, with reference to FIG. 13, the operations of the memory master entry portion 25 and the moving channel controlling portion 26 will be described.

Referring to FIG. 13, the memory masters 10, 11, and 12 are in idle states at T0. The count of the idle counter 19 is "60". The count of the access counter 22 is "5". Addresses add 10-1, add 10-2, and add 10-3 are stored in the storage areas 0 to 3 in the channel information storing portion 13, respectively. The count of the idle counter 20 is "58". The count of the access counter 23 is "4". Addresses add 11-1 and add 11-2 are stored in the storage areas 3 and 4 in the channel information storing portion 13, respectively. The count of the idle counter 21 is "56". The count of the access counter 24 is "7". Addresses add 12-1, add 12-2, add 12-3, and add 12-4 are stored in the storage areas 12, 13, 14, and 15 of the channel information storing portion 13, respectively.

When the memory masters 10 to 12 stay in the idle states, the idle counters 19 to 21 are continuously increased. The count of the idle counter 19 becomes "64" (at T4). The count "64" is designated when the system is initialized, and represents that the memory master 10 has not issued an access request for a long time. Though the memory master 10 still stay in an idle state, the count of the idle counter 19 does not exceed "64". Thus, the idle counter 19 holds the count "64". At this point, the access counter 22 is cleared (at T5). Thus, it is determined that the memory master 10 has not issued an access request for a long time. Thus, the number "10" that represents the memory master 10 is stored to the highest movable channel 251 in the memory master entry portion 25 (at T4).

Likewise, since the idle counter 20 is increased and the count thereof becomes "64" (at T6), the idle counter 20 is not increased any more. Thus, the idle counter 20 holds the count "64". At this point, the access counter 23 is cleared. The number "11" that represents the memory master 11 is stored to the movable channel 252 ranked at the second highest in the memory master entry portion 25.

Likewise, since the idle counter 21 is increased and the count thereof becomes "64" (at T9), the idle counter 21 is not increased any more. Thus, the idle counter 21 holds the count "64". At this time, the access counter 24 is cleared. The number "12" that represents the memory master 12 is stored to the movable channel 253 ranked at the third highest in memory master entry portion 25.

At this point, the memory master 10 issues an access request (at T9). When the arbiter portion 27 permits the access request (at T10), the memory master 10 ceases issuing the access request (at T11). The idle counter 19 is cleared. The access counter 22 is increased by 1. Thus, the count of the access counter 22 becomes "1" (at T11). The memory address of the access request is add 10-3. The memory address add 10-3 matches the memory address stored in a storage area which is ranked at the highest in the LRU controlling portion 16 among storage areas 0 to 3 in the channel information storing portion 13. Thus, the LRU controlling portion 16 ranks the channel information of the address add 10-3 at the lowest. In addition, the LRU controlling portion 16 upwardly shifts the ranks of the addresses add 10-1 and add 10-2 by one. At the same time, memory interface controlling portion 28 generates a hit cycle on the memory bus 80 (at T11).

When the access cycle for the memory master 10 is completed and the memory master 10 becomes an idle state, the idle counter 19 resumes counting (at T14). In addition, the number "10" stored in the movable channel 251 in the memory master entry portion 25 is deleted. At this point, "11" and "12" that are stored in the lower movable channels 252 and 253 than the movable channel 251 are upwardly shifted to the movable channels 251 and 252. In such a manner, even if an entry is stored in the memory master entry portion 25, when a relevant memory master generates an access cycle, the entry is deleted. In that example, the memory address of the issued access request matches the memory address stored in the channel information storing portion 13. However, the same operation is performed regardless of whether or not they match.

Next, the memory master 10 issues an access request again (at T13). When the arbiter portion 27 permits the access request from the memory master 10 (at T14), the memory master 10 ceases issuing the access request (at T15). At this point, the idle counter 19 is cleared. The access counter 22 is increased by 1. Thus, the count of the access counter 22 becomes "2" (at T15). The memory address of the issued access request is add 10-4. Since the memory address add 10-4 does not match any memory addresses stored in the storage areas 0 to 3 in the channel information storing portion 13. Thus, it is determined that a channel miss has taken place. Since the number "10" that represents the memory master 10 that has issued the access request is not stored in the memory master entry portion 25, the moving channel controlling portion 26 designates the memory master 11 which is ranked at the top in memory master entry portion and designates as a movable channel the channel which is ranked at the top in the LRU controlling portion 17 among the channels which are managed in the LRU controlling portion 17.

The storage area which has been stored the designated channel changes from a storage are for the memory master 11 to a storage area for the memory master 10 (at T15). Thus, the number of channels (storage areas) assigned to the memory master 10 are changed from 3 to 4. In addition, the address add 10-4 corresponding to the access request at T13 is ranked at the lowest in the LRU controlling portion 16. The ranks of other channel information are upwardly shifted by one. When the channel (storage area) is moved, the number "11" that represents the memory master 11 is deleted from the memory master entry portion 25. The remaining "12" is shifted at the highest rank in the memory master entry portion 25. In addition, the count of the idle counter 20 corresponding to the memory master 11 is cleared (at T15). Thereafter, the idle counter 20 resume counting (at T16). When the access cycle for the memory master 10 is completed and the memory master 10 becomes an idle state, the idle counter 19 resumes counting (at T26).

Next, with reference to FIG. 14, a channel moving operation in a case where the memory master entry portion 25 does not have any entry will be described.

Referring to FIG. 14, all the memory masters 10 to 12 are in idle states at T0. The count of the idle counter 19 is "20". The count of the access counter 22 is "4". Addresses add 10-1, add 10-2, and add 10-3 are stored in the storage areas 0 to 2 in the channel information storing portion 13, respectively. The count of the idle counter 20 is "10". The count of the access counter 23 is "5". Addresses add 11-1 and add 11-2 are stored in the storage areas 3 and 4 in the channel information storing portion 13, respectively. The count of the idle counter 21 is "30". The count of the access counter 24 is "4". Addresses add 12-1, add 12-2, add 12-3, and add 12-4 are stored to the storage areas 12 to 15 in the channel information storing portion 13, respectively. The memory master entry portion 25 does not have an entry.

At that point, the memory master 10 issues an access request (at T1). When the arbiter portion 27 permits the access request from the memory master 10 (at T2), the memory master 10 ceases issuing the access request. The idle counter 19 is cleared. The access counter 22 is increased by 1. Thus, the count of the access counter 22 becomes "5" (at T3). The memory address of the access request is add 10-4. Since the memory address add 10-4 does not match any memory address stored in the storage areas 0 to 2 in the channel information storing portion 13. Thus, it is determined that a channel miss has taken place. Thus, a channel miss is generated on the memory bus 80.

Because a channel move is required due to an occurrence of a channel miss and the memory master entry portion 25 does not have an entry, the moving channel controlling portion 26 compares the counts of the access counters 22 to 24. In the example, because the access counter 22 and the access counter 24 share the minimum value of "4", the moving channel controlling portion 26 determines whether or not any one of the access counter 22 and the access counter 24 corresponds to the memory master 10 that has issued the access request.

The memory master 10 has issued the access request. One of the access counters whose counts are the minimum values is the access counter 22. In addition, the access counter 22 corresponds to the memory master 10. Thus, only performed is updating the channel information in the channel information storing portion 13. In other words, the memory address in the channel information which is ranked at the highest position in the LRU controlling portion 16 is changed to the memory address add 104 which corresponds to the access request. The channel information thus changed is ranked at the lowest in the LRU controlling portion 16. The ranks of of the other channel information are upwardly shifted by one (at T3). After the cycle of the memory master 10 is completed and the memory master 10 becomes an idle state, the idle counter 19 resumes counting (at T14).

Thereafter, the memory master 10 issues an access request again(at T13). When the arbiter portion 27 permits the access request from the memory master 10 (at T14), the memory master 10 ceases issuing the access request. The idle counter 19 is cleared. The access counter 22 is increased by 1. The count of the access counter 22 becomes "6" (at T15). The memory address of the access request is add 10-5. The memory address add 10-5 does not match any memory addresses stored in the storage areas 0 to 3 in the channel information storing portion 13. Thus, it is determined that a channel miss has taken place. As a result, a channel miss is generated on the memory bus 80.

Because a channel move is required due to an occurrence of a channel miss and the memory master entry portion 25 does not have an entry, the moving channel controlling portion 26 compares the counts of the access counters 22 to 24. In this case, since the access counter 24 holds the minimum count of "4", the moving channel controlling portion 26 designates the memory master 12 which corresponds to the access counter 24 and designate as a movable channel the channel which is ranked at the top in the LRU controlling portion 18 among the channels which are assigned to the memory master 12 and managed by the LRU controlling portion 18.

The designated channel (storage area) comes to assigned to the memory master 10 (at T15). In the channel information storing portion 13, the number of channels (storage areas) assigned to the memory master 10 is changed from 3 to 4. The address add 10-5 of the access request is ranked at the lowest in the LRU controlling portion 16. The ranks of the other channel information are upwardly shifted by one. After the cycle for the memory master 10 is completed and the memory master 10 becomes an idle state, the idle counter 19 resumes counting (at T26).

The relation between the storage areas in the channel information storing portion 13 and the memory masters 10 to 12 is stored as relation information in a controlling portion (not shown). When a channel move takes place, the relation information is updated. Each member of the virtual channel memory access controlling circuit 90 operates with reference to the relation information.

In addition, the LRU controlling portions 16 to 18 have 16-bit flags for all storage areas which amount to 16. The LRU controlling portion 16 (17, or 18) turns on flag for storage areas assigned to the relevant memory master and turns off flags for storage areas that are not assigned to the relevant memory master so as to perform the LRU controlling operation for storage areas assigned to the relevant memory master. When the channel move takes place, the LRU controlling portion 16 (17, or 18) updates the flags corresponding to the relation information.

Next, a second embodiment of the present invention will be described. According to the second embodiment, the channel information storing portion 13 does not store channel numbers. Instead, when an access cycle of the VCM 29 is generated, a channel number corresponding to a storage area that stores an address to be sent to the memory bus 80 is created using relation information. Thus, the hardware scale of the channel information storing portion 13 is be reduced.

As was described above, according to the present invention, in the system using the VCM with the LRU controlling method, even if the number of channels assigned to each memory master is improper, the number of channels to be controlled is moved among memory masters in consideration of the access frequency. Thus, the use efficiency of the channels of the VCM is improved. Consequently, the access performance can be improved.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A virtual channel memory access controlling circuit for controlling accesses from a plurality of memory masters to a virtual channel memory having a plurality of channels, comprising:

a channel information storing portion having a plurality of storage areas, each of said storage areas being assigned to any of said memory masters, each of said storage areas corresponding to each of said channels, each of said storage areas having a channel number and a memory address, said channel number identifying a channel, and said memory address being sent to said virtual channel memory;

detecting means for detecting necessity of a change of assignment of storage area between said memory masters;

changing means for dynamically changing the assignment of the storage area between said memory masters; and a plurality of idle counters, each of which corresponds to each of said memory masters, for increasing an idle count when the corresponding memory master is in an idle state and for clearing the idle count, when the corresponding memory master accesses said virtual channel memory, wherein the idle count is used as information for determining whether or not the corresponding memory master has not accessed said virtual channel memory for a predetermined time.

2. The virtual channel memory access controlling circuit as set forth in claim 1, further comprising:

a memory master entry portion for enqueuing an identifier of a memory master corresponding to the idle counter concerned with the idle count reaching the predetermined value to a queue, when an idle count of any of said idle counters reaches a predetermined value; and a move channel controlling portion as said first memory master, a master which is identified by said identifier at the top of said queue, and designating, as one or more candidates for said storage area concerned with the change of the assignment, one or more storage areas which are assigned to said designated memory master, when an assignment of any storage area should be changed from a first memory master to a second memory master, for designating.

3. The virtual channel memory access controlling circuit as set forth in claim 2, further comprising:

a plurality of LRU controlling portions, each of which corresponds to each of said memory masters, for managing, in LRU system, one or more identifiers of one or more storage areas which have been used for a corresponding memory master to access to said memory master, wherein said move channel controlling portion references identifiers of storage areas managed by said LRU controlling portion for deciding which of storage areas assigned to said first memory master is a target of change of assignment.

4. The virtual channel memory access controlling circuit as set forth in claim 3, wherein if said first memory master is the same as said second memory master, LRU information managed by said LRU managing portion is changed, and change of assignment of a storage area between memory masters is not performed.

5. The virtual channel memory access controlling circuit as set forth in claim 2, further comprising:

a plurality of access counters, each of which corresponds to each of said memory masters, for increasing an access count when a corresponding memory master accesses said virtual memory and for clearing the access count when a the corresponding idle counter is increased, said access count being used as information that represents frequency of accesses from the corresponding memory master to said virtual channel memory, wherein when said queue stores no identifier, said move channel controlling portion designates, as said first memory master, a memory master which corresponds to an access counter of which the access count is minimum.

6. The virtual channel memory access controlling circuit as set forth in claim 5, wherein if there are a plurality of access counters whose access counts are the minimum, said move channel controlling portion designates, as said first memory master, a memory master among masters which correspond to the plurality of access counters whose access counters are the minimum in accordance with a predetermined priority.

7. The virtual channel memory access controlling circuit as set forth in claim 2, wherein said memory master entry portion deletes an identifier of the memory master which is designated as said first memory master from said queue.

8. The virtual channel memory access controlling circuit as set forth in claim 2, wherein said detecting means detects the necessity of change of assignment of a storage area between memory masters when a channel miss takes place for any memory master, and wherein the second memory master is a memory master for which the channel miss takes place.

9. A virtual channel memory access controlling circuit for controlling accesses from a plurality of memory masters to a virtual channel memory having a plurality of channels, comprising:

a channel information storing portion having a plurality of storage areas, each of said storage areas being assigned to any of said memory masters, each of said storage areas corresponding to each of said channels, each of said storage areas having a memory address to be sent to said virtual channel memory;

means for generating channel numbers, each of which identifies a channel which corresponds to each of said storage areas;

detecting means for detecting necessity of a change of assignment of storage area between said memory masters;

changing means for dynamically changing the assignment of the storage area between said memory masters; and a plurality of idle counters, each of which corresponds to each of said respective memory masters, for increasing an idle count when the corresponding memory master is in an idle state and for clearing the idle count when the corresponding memory master accesses said virtual channel memory, wherein the idle count is used as information for determining whether or not the corresponding memory master has not accessed said virtual channel memory for a predetermined time.

10. The virtual channel memory access controlling circuit as set forth in claim 9, further comprising:

a memory master entry portion for enqueuing an identifier of a memory master corresponding to the idle counter concerned with the idle count reaching the predetermined value to a queue, when an idle count of any of said idle counters reaches a predetermined value; and a move channel controlling portion for designating, as said first memory master, a master which is identified by said identifier at the top of said queue, and designating, as one or more candidates for said storage area concerned with the change of the assignment, one or more storage areas which are assigned to said designated memory master, when an assignment of any storage area should be changed from a first memory master to a second memory master.

11. The virtual channel memory access controlling circuit as set forth in claim 10, further comprising:

a plurality of LRU controlling portions, each of which corresponds to each of said memory masters, for managing, in LRU system, one or more identifiers of one or more storage areas which have been used for a corresponding memory master to access to said memory master, wherein said move channel controlling portion references identifiers of storage areas managed by said LRU controlling portion for deciding which of storage areas assigned to said first memory master is a target of change of assignment.

12. The virtual channel memory access controlling circuit as set forth in claim 11, wherein if said first memory master is the same as said second memory master, LRU information managed by said LRU managing portion is changed, and change of assignment of a storage area between memory masters is not performed.

13. The virtual channel memory access controlling circuit as set forth in claim 10, further comprising:

a plurality of access counters, each of which corresponds to each of said memory masters, for increasing an access count when a corresponding memory master accesses said virtual memory and for clearing the access count when a the corresponding idle counter is increased, said access count being used as information that represents frequency of accesses from the corresponding memory master to said virtual channel memory, wherein when said queue stores no identifier, said move channel controlling portion designates, as said first memory master, a memory master which corresponds to an access counter of which the access count is minimum.

14. The virtual channel memory access controlling circuit as set forth in claim 13, wherein if there are a plurality of access counters whose access counts are the minimum, said move channel controlling portion designates, as said first memory master, a memory master among masters which correspond to the plurality of access counters whose access counters are the minimum in accordance with a predetermined priority.

15. The virtual channel memory access controlling circuit as set forth in claim 10, wherein said memory master entry portion deletes an identifier of the memory master which is designated as said first memory master from said queue.

16. The virtual channel memory access controlling circuit as set forth in claim 10, wherein said detecting means detects the necessity of change of assignment of a storage area between memory masters when a channel miss takes place for any memory master, and wherein the second memory master is a memory master for which the channel miss takes place.

* * * * *

UNITED STATES PATENT AND TRADEMARK OFFICE
CERTIFICATE OF CORRECTION

PATENT NO.   : 6,505,287 B2
DATED        : January 7, 2003
INVENTOR(S)  : Takeshi Uematsu It is certified that error appears in the above-identified patent and that said Letters Patent is hereby corrected as shown below:

<u>Column 14,</u>
Line 4, after "80" delete "(at T1)" insert -- (at T10) --

Signed and Sealed this

First Day of July, 2003

JAMES E. ROGAN
*Director of the United States Patent and Trademark Office*